Aug. 11, 1942.  E. C. PATTEE  2,292,769
RECOVERY OF SOLIDS FROM INDUSTRIAL WASTES
Filed Dec. 17, 1938  2 Sheets-Sheet 2
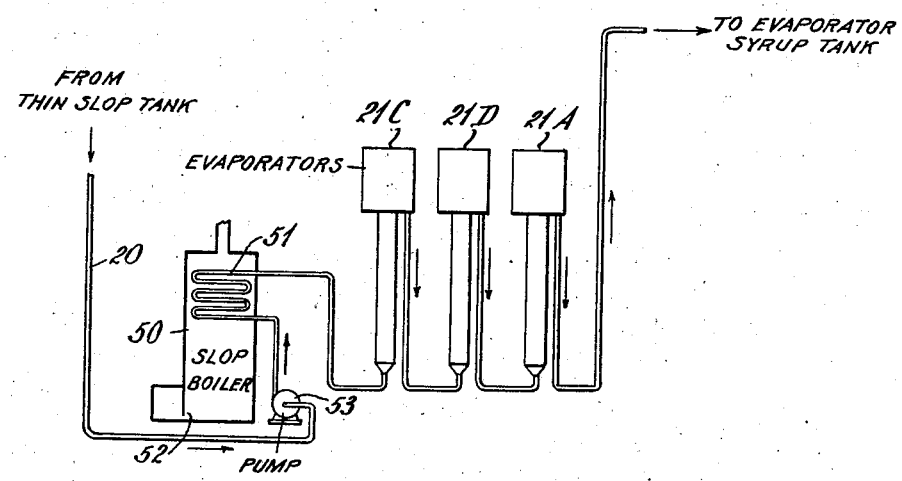
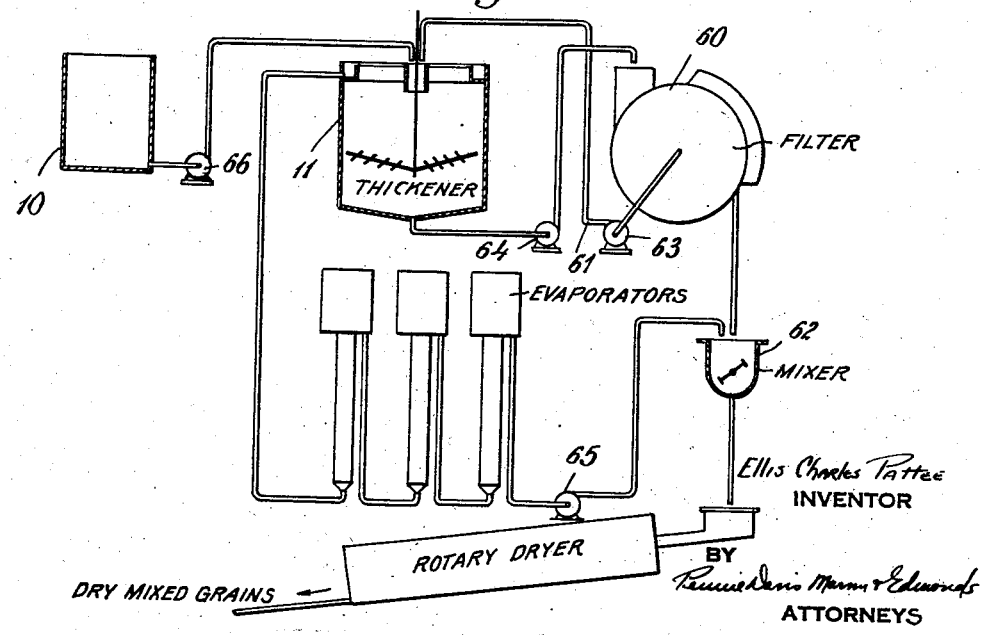

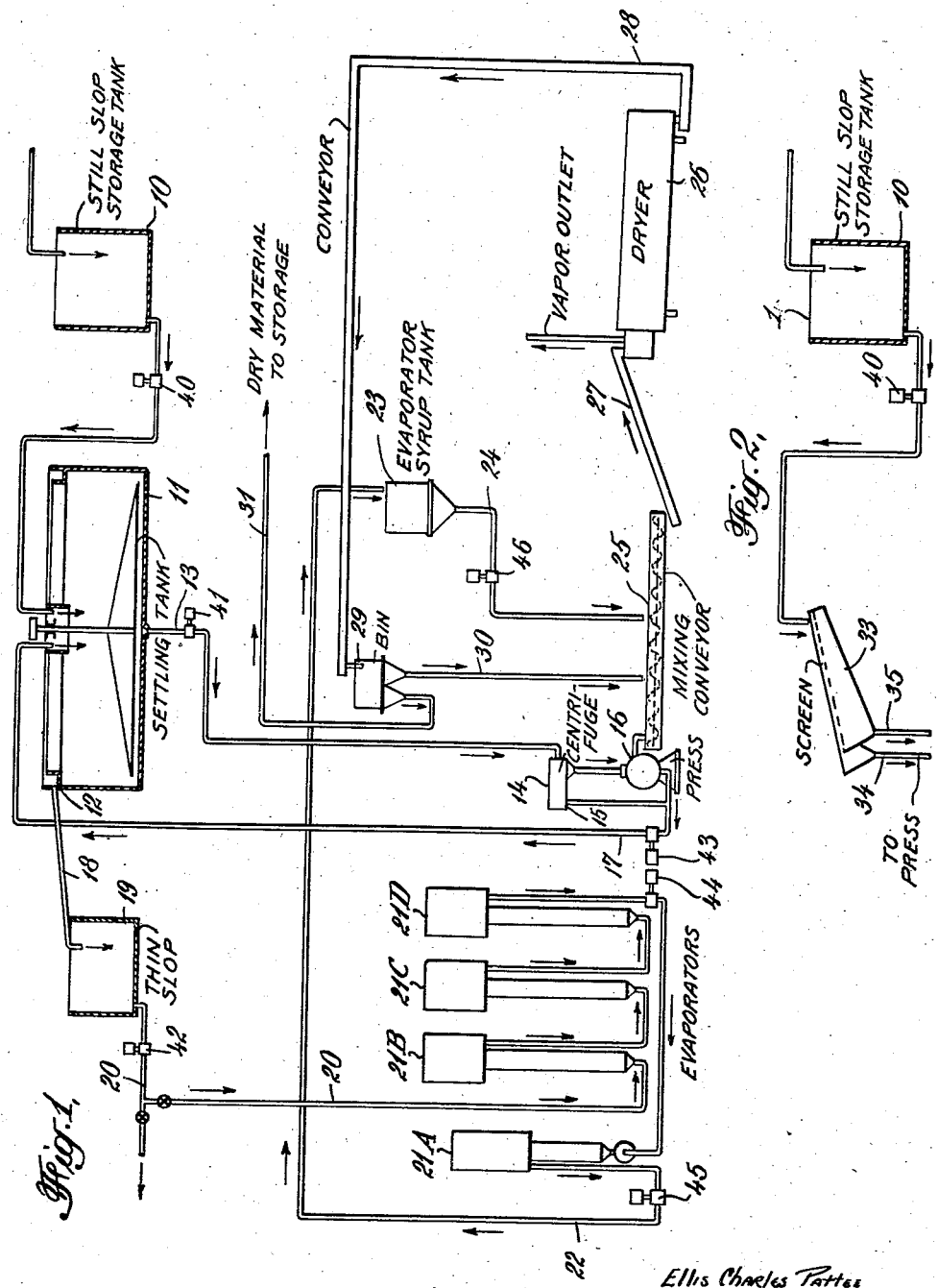

Patented Aug. 11, 1942

2,292,769

UNITED STATES PATENT OFFICE 2,292,769

RECOVERY OF SOLIDS FROM INDUSTRIAL WASTES

Ellis Charles Pattee, Cincinnati, Ohio, assignor to National Distillers Products Corporation, New York, N. Y., a corporation of Virginia Application December 17, 1938, Serial No. 246,339

6 Claims. (Cl. 99—5)

This invention relates to a process for the recovery of solids from distillery slop, spent beer, canning plant waste and other similar industrial waste liquids which contain valuable solids in suspension and in solution.

Alcohol distilleries and similar plants have always been confronted with the problem of the recovery of valuable material in the disposal of their waste residues, commonly termed "spent beer" or "still slop." One of the chief problems has been to devise a means to recover the valuable solids from the slop at a cost sufficiently low to permit of profitable operation. The great majority of the processes so far devised or used have been found too expensive to be practical or profitable. The same problem which has confronted alcohol distilleries, has also been a serious one facing other industries, such as canning plants having waste liquids, especially where the waste liquids in addition to having solids in solution also contain insoluble solids in suspension. In distillery slop the insoluble solids in suspension in the liquid vary greatly in size ranging from microscopic particles such as yeast cells to large grain hulls about one quarter of an inch in length. For this reason and due to the nature of the slop, which is generally foamy and dense, it has been extremely difficult to separate the colloidal proteins held in suspension from the water solution.

The solids which occur in the distillery slop, or plant waste, contain valuable food elements, including fiber, protein, oil, yeast, and soluble carbohydrates. If these solids can be recovered economically and practically, they may be manufactured into food products with high nutritive value. This type of food product has been found especially satisfactory for use as a cattle or stock food.

The new process of this invention may be advantageously employed in the recovery of solids both in suspension and in solution in many different types of waste liquids. For purposes of description here, the new process will be considered in connection with the recovery of solids from distillery slop, although it is equally applicable to other like industrial waste liquids. The slop as it comes from the dealcoholizing still contains both soluble and insoluble materials. The insoluble solids are generally present in particle sizes ranging from coarse grain hulls down to fine colloidal proteins, and the latter are usually in suspension. The coarse grain hulls do not present any great problem in their separation from the solution since they may be easily screened, but it is very difficult to economically and practically separate the fine colloidal proteins.

For a clearer understanding of the invention, reference may be had to the accompanying drawings, in which:

Figure 1 is a flow diagram of apparatus used in carrying out the process, and Figures 2, 3 and 4 are similar diagrams showing modifications of parts of the apparatus.

In this process the slop from the dealcoholizing stills is stored in a tank 10 and from the tank the slop is pumped to a settling tank or thickener 11 where it is allowed to form a sediment. When the insoluble solids have settled to a slurry, a relatively clear supernatant liquor containing the soluble solids is drawn off from the upper part of the tank, through a launder 12 and the slurry in the bottom of the settling tank 11 is then taken off through a pipe 13 and carried to a centrifuge 14, which may be either of the batch or continuous type. In the centrifuge the solids are separated from the excess liquid which is discharged at 15 and returned, through a conduit 17, to the settling tank for further clarification. After leaving the centrifuge, the solids pass to a filter or mechanical press 16 where part of the remaining liquid is expressed from it. The liquid squeezed from the cake in the filter press is returned to the settling tank with the liquid discharged from the centrifuge.

The supernatant liquor containing the soluble solids is carried from the launder 12 by the conduit 18 to the thin slop tank 19 where it is stored. From the bottom of the thin slop tank the liquor is drawn through a pipe 20 to be either further processed or run to the sewer for disposal. When the liquor is to be further processed it is piped to a series of evaporators 21A, 21B, 21C and 21D. These evaporators having the usual heating tubes, heated by steam, are arranged in a battery so that the liquid from the tank 19 enters evaporator 21B and from there is forced to evaporator 21C, then to 21D, and from there to evaporator 21A. Pumps in the conduits leading into the battery of evaporators cause a forced circulation in which the liquor is pumped through the heating tubes of the evaporators at a velocity of greater than five linear feet per second. Under forced circulation the evaporator tubes will not foul easily, and it has been found that the evaporators will remain clean for long periods. The concentrated evaporator discharge, generally in the form of a syrup, is then carried from the evaporator 21A by a pipe 22 to an evaporator syrup tank 23 where the syrup is stored.

From the tank 23 the syrup flows through a pipe 24 to a mixing conveyor 25 where it is mixed with the press cake being carried from the press 16. In the mixing conveyor the press cake and the syrup may be mixed with sufficient previously dried material from a storage bin to be presently described, to prevent caking or balling while in the conveyor or in the dryer. The mixture from the mixing conveyor is carried to a drier 26 by another conveyor 27, and from the drier a conveyor 28 carries the dried material to a bin 29 where it is stored and further treated. Where it may be desired to add dried material to the mixture in the conveyor 25, such dried material is carried from the bin 29 by the pipe 30 to the conveyor. The bulk of the dried material is carried off from the bin by conveyor 31 for storage use or further processing, as may be desired.

In some cases, where the solid particles in suspension are large or where it is otherwise desirable, the spent beer may be carried from the still slop storage tank 10 to a screen 33 shown in Figure 2, which may be interposed between the storage tank 10 and the settling tank 11, or take the place of the settling tank. In the latter case the rough screenings are carried directly to the filter press 16 by a pipe 34 and the screened liquid slop is carried to the centrifuge 14 by a pipe 35 for further treatment, as has been outlined above. In such a case the solids from the centrifuge and the screenings are mixed in the filter or mechanical press hopper and the resulting mixture is deliquefied in the press 16.

In the flow diagram illustrated in Figure 1, a battery of evaporators 21A, 21B, 21C, 21D are shown employed for concentrating the overflow liquor from the settling tank. Due to the enormous amounts of steam necessary, the use of evaporators is expensive and it has been found in some instances that a more economical recovery of the soluble solids from this liquid may be obtained by the substitution of a boiler in place of one of the evaporators. For most efficient operation, it has been found that where a boiler is substituted for the first evaporator 21B, the cost of operation is very much less. It has been the normal practice of distillers in the evaporation of liquors to use steam as the source of heat in a multiple effect evaporator, and as this requires the evaporation of enormous quantities of water, the cost of evaporation is very high in relation to the value of the recovered products. I have found that it is possible under most conditions, to run the waste liquids or solutions directly through boiler tubes in direct fire boilers. The liquids passing through the tubes are heated by the direct flames or the combustion gases, and in this way the moisture in the liquids containing the soluble solids is reduced by evaporation. The steam from such evaporation may be employed in heating the remaining evaporators. Since there is a tendency of the dissolved solids to precipitate or cake in the tubes or the body, it has been found advantageous to cause the flow of the liquids to be rapid and continuous. By the rapid flow of the liquids through the tubes, the solids are prevented from caking or precipitating in the tubes or in the boiler heating surfaces.

Figure 3 shows a boiler 50 having the usual heating coils 51 and fire-box 52. The overflow liquor having solids in solution passes through the pipe 20 to the boiler. In order to provide rapid passage of the solution through the heating tubes, a pump 53 is installed, and it has been found advantageous to pass the liquid through the tubes at a linear velocity of greater than five feet per second. From the boiler, the liquid passes successively to the evaporators 21C, 21D, and 21A. Similar results can be obtained in large bodied vessels heated by flame or combustion gases, when the liquid having solids in solution is vigorously agitated over the surface. It will be obvious that the type of boiler employed in the step may be varied, and that shown in Figure 3 is only for the purpose of illustration.

In many cases it has been found that the process for the recovery of the solids will operate more efficiently by the substitution of a filter for the centrifuge and the mechanical press. Such an arrangement is illustrated in Figure 4. The distillery slop from the storage tank 10 is carried to the settling tank 11 where the insoluble solids are allowed to settle and form a slurry in the bottom of the settling tank. From the settling tank 11, the slurry is carried to a filter 60. The filtrate from which the slurry has been precipitated is returned to the settling tank by a conduit 61 to be there treated again, which slurry is carried from the filter 60 to a mixer 62 where it is mixed with the evaporator syrup in the same way as described in connection with Figures 1, 2, and 3. The liquid containing the soluble material is taken off from the upper part of the settling tank, and is treated in the same manner as has been previously outlined to evaporate off some of the moisture, and to form a syrup of the soluble solids.

This process has been found especially advantageous where the distillery slop settles quickly, since it eliminates a step in the concentration of the slurry.

While the process as outlined above includes the recovery of substantially all solids present in the distillery slop as one dry product, it may in some cases be desired to recover the solids as two or more products. For example, one of the products may consist of the insoluble solids which are present in still slop as coarse and colloidal substances, and such a product might be utilized in either the wet or dry state. The coarse and colloidal substances generally contain high percentages of protein, fiber, oil and yeast. The other product is soluble solids recovered from the liquid from which substantially all of the insoluble substances have been separated. The dried products from this solution generally contain high percentages of soluble carbohydrates and inorganic minerals.

In the treatment of distillery slop, it is desirable in some cases to accelerate or promote the coagulation and settling of the fine colloidal materials by the addition of coagulants to the still slop while it is in the still slop storage tank. Lime, sodium carbonate, ferric sulfate, bentonite, and diatomaceous earth have been found efficacious for the purpose.

Some types of distillery waste articles or slops have such physical characteristics that the insoluble solids will settle rapidly. In these cases the settling tank may be eliminated and the slop passed directly from the slop storage tank 10 to the centrifuge 14. The centrifuge cake then will be carried to the filter press 16, and the residual liquid from the centrifuge and the filter press will be carried to the thin slop tank 19. By this operation, and the elimination of the settling tank, it is quite obvious that the time required can be greatly reduced. In other cases where the distillery slops have such physical characteristics that the insoluble solids will filter rapidly, it has been found advantageous to carry the slurry from the settling tank 11 directly to the filter press and thus eliminate the centrifuging step with consequent saving in time and energy.

The process of this invention has the additional advantage in that the time necessary for the recovery of the solids is comparatively short. It has been found that where the slop has been screened through a window screen and then allowed to settle, the completion of the process after the material leaves the thickener will require only about eight to twenty minutes. When lime or other coagulating agents are employed, the time for the settling of the material can also be greatly reduced.

In carrying out the process as outlined in this invention, it is necessary that pumps be employed to circulate the material through the various parts of the apparatus. Since the material which will be recovered may vary to a great extent, pumps of greater or small capacity may be employed. Such pumps are illustrated on the flow-sheet by figures numbered 40, 41, 42, 43, 44, 45, 46, 53, 63, 64, 65 and 66. However, where it is necessary, additional pumps may be employed to force the material through the apparatus at the desired speed of flow.

By the process of this invention the recovery of valuable materials from spent beer or liquid waste products of distilleries and canning factories may be quickly and easily obtained. The average distillery can recover sufficient materials from its spent beer or slop by the use of this process to make it practical to install apparatus for this purpose.

The process above outlined has the added advantage of disposing of the material which would otherwise be carried to the sewers and there become a serious problem of disposition. In many localities where sewage disposal is an acute problem, the addition of large amounts of distillery slop having solids in suspension and in solution would either necessitate the installation of additional sewage disposal equipment or tax the facilities there existent. With the employment of this process the waste material carried to the sewers is only a watery liquid and can thus be disposed of easily.

I claim:

1. The process of treating distillery slop and like industrial waste liquids containing recoverable solids in solution and in suspension which comprises, screening the liquid for the removal of coarse grain materials contained therein, subjecting the liquid to sedimentation and decantation to separate the suspended solids in the form of a slurry from a supernatant liquor containing solids in solution, substantially separating the solids of said slurry from the liquid part thereof, evaporating said supernatant liquor and the separated liquid part of said slurry to recover the solids contained therein, and mixing the solids thus recovered by evaporation and the separated solids of said slurry.

2. The process of treating distillery slop and like industrial waste liquids containing recoverable solids in solution and in suspension which comprises, subjecting the liquid to sedimentation and decantation to separate the suspended solids in the form of a slurry from a supernatant liquor containing solids in solution, substantially separating the solid part of said slurry from the liquid part thereof, circulating said supernatant liquor and the separated liquid part of said slurry through heated passages at a velocity greater than five linear feet per second for the evaporation of the moisture and the recovery of the solids contained therein, and mixing the solids thus recovered by evaporation and the separated solid part of said slurry.

3. The process of treating distillery slop and like industrial waste liquids containing recoverable solids in solution and in suspension which comprises, subjecting the liquid to settling to separate the suspended solids in the form of a slurry from a supernatant liquor containing solids in solution, filtering said slurry to substantially separate the liquid and the solid parts thereof, returning the separated liquid part of said slurry for further settling, evaporation of the supernatant liquor to recover the solids contained therein, and mixing the solids thus recovered by evaporation with the separated solid part of said slurry.

4. The process of treating distillery slops and like industrial waste liquids containing recoverable solids in solution and in suspension, which comprises subjecting the liquid to sedimentation and decantation to separate the suspended solids in the form of a slurry from a supernatant liquor containing solids in solution, centrifuging said slurry to substantially separate the solid portions thereof from the liquid portion, and returning the separated liquid portion of said slurry for further settling.

5. The process of treating distillery slops and like industrial waste liquids containing recoverable solids in solution and in suspension which comprises subjecting the liquid to sedimentation and decantation to separate the suspended solids in the form of a slurry from a supernatant liquor containing solids in solution, centrifuging said slurry to substantially separate the solid portions thereof from the liquid portion, returning the separated liquid portion of said slurry for further settling, evaporating said supernatant liquor to recover the solids contained therein, and mixing the solids thus recovered by evaporation and the separated solids of said slurry.

6. The process of treating distillery slops and like industrial waste liquids containing recoverable solids in solution and in suspension which comprises subjecting the liquid to sedimentation and decantation to separate the suspended solids in the form of a slurry from a supernatant liquor containing solids in solution, centrifuging said slurry to substantially separate the solid portions thereof from the liquid portion, returning the separated liquid portion of said slurry for further settling, circulating said supernatant liquor through heated passages at a velocity greater than 5 linear feet per second for the evaporation of the moisture and the recovery of the solids contained therein, and mixing the solids thus recovered by evaporation and the separated solid part of said slurry.

ELLIS CHARLES PATTEE.